US012046198B2

(12) United States Patent
Kwon et al.

(10) Patent No.: US 12,046,198 B2
(45) **Date of Patent: *Jul. 23, 2024**

(54) DISPLAY DEVICE AND DRIVING METHOD THEREOF

(71) Applicant: Samsung Display Co., Ltd., Yongin-Si (KR)

(72) Inventors: Sangan Kwon, Cheonan-si (KR); Hui Nam, Suwon-si (KR); Soon-Dong Kim, Osan-si (KR); Changnoh Yoon, Seoul (KR); Seungjae Lee, Anyang-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/981,599

(22) Filed: Nov. 7, 2022

(65) Prior Publication Data

US 2023/0067214 A1 Mar. 2, 2023

Related U.S. Application Data

(63) Continuation of application No. 17/199,680, filed on Mar. 12, 2021, now Pat. No. 11,495,175.

(51) Int. Cl.
*G09G 3/3233* (2016.01)
*G09G 3/00* (2006.01)
*G09G 5/14* (2006.01)

(52) U.S. Cl.
CPC ............ *G09G 3/3233* (2013.01); *G09G 5/14* (2013.01); *G09G 3/035* (2020.08); *G09G 2300/0426* (2013.01); *G09G 2300/0819* (2013.01); *G09G 2310/0213* (2013.01); *G09G 2320/10* (2013.01)

(58) Field of Classification Search
None
See application file for complete search history.

(56) References Cited

U.S. PATENT DOCUMENTS

| | | | |
|---|---|---|---|
| 9,633,608 | B2 | 4/2017 | Shin |
| 10,685,614 | B2 | 6/2020 | Mori et al. |
| 2005/0151884 | A1 | 7/2005 | Oh |

(Continued)

FOREIGN PATENT DOCUMENTS

| | | | |
|---|---|---|---|
| KR | 100923347 | B1 | 10/2009 |
| KR | 1020150069850 | A | 6/2015 |
| KR | 1020170108840 | A | 9/2017 |

*Primary Examiner* — Matthew Yeung
(74) *Attorney, Agent, or Firm* — CANTOR COLBURN LLP

(57) ABSTRACT

A display device includes a plurality of pixels arranged in m rows and n columns, where the pixels receive write scan signals, data voltages and compensation scan signals, a plurality of write scan lines which provides the write scan signals to the pixels, a plurality of data lines which provides the data voltages to the pixels, and a plurality of compensation scan lines which provides the compensation scan signals to the pixels, wherein in h-th to p-th frames, the data voltages are applied to pixels arranged in first to i-th rows, and in h-th to (h+k)-th frames, the data voltages are applied to pixels of a row unit by increasing sequentially the number of the row unit to which the data voltages are applied in at least one row unit from an i-th row to an (i+1)-th row.

19 Claims, 11 Drawing Sheets

(56) References Cited

U.S. PATENT DOCUMENTS

2014/0320479 A1* 10/2014 Kaneko ............... G02F 1/13306
345/212
2015/0348464 A1* 12/2015 In ......................... G09G 3/2022
345/82
2017/0331061 A1 11/2017 Lee et al.

* cited by examiner

DISPLAY DEVICE AND DRIVING METHOD THEREOF

This application is a continuation of U.S. patent application Ser. No. 17/199,680, filed on Mar. 12, 2021, which claims priority to Korean Patent Application No. 10-2020-0097969, filed on Aug. 5, 2020, and all the benefits accruing therefrom under 35 U.S.C. § 119, the content of which in its entirety is herein incorporated by reference.

BACKGROUND

1. Field

The disclosure herein relates to a display device and a driving method thereof.

2. Description of the Related Art

In general, electronic devices such as smart phones, digital cameras, notebook computers, navigation systems, and smart televisions, which provide images to users, include a display device for displaying images. The display device generates an image and provides the generated image to a user through a display screen.

The display device may include a display panel including a plurality of pixels for generating an image, and a driving unit for driving the pixels. Each of the pixels may include a light emitting element, a plurality of transistors connected to the light emitting element, and at least one capacitor connected to the transistors.

When the display panel is driven at a driving frequency, the display panel may include a moving image unit displaying a moving image and a still image unit displaying a still image. The moving image unit may receive continuously updated images during the driving frequency. The still image unit may maintain image data initially provided during the driving frequency, and then may not receive an image signal.

SUMMARY

The disclosure provides a display device and a driving method thereof for preventing a boundary between a moving image unit displaying a moving image and a still image unit displaying a still image from being visually recognized.

An embodiment of the invention provides a display device including: a plurality of pixels arranged in m rows and n columns, where the pixels receive write scan signals, data voltages, and compensation scan signals; a plurality of write scan lines which provides the write scan signals to the pixels; a plurality of data lines which provides the data voltages to the pixels; and a plurality of compensation scan lines which provides the compensation scan signals to the pixels, wherein in h-th to p-th frames, the data voltages are applied to pixels arranged in first to i-th rows, and in h-th to (h+k)-th frames, the data voltages are applied to pixels of a row unit by increasing sequentially a number of the row unit to which the data voltages are applied in at least one row unit from an i-th row to an (i+1)-th row, where in the h-th to p-th frames, the compensation scan signals are not applied to pixels arranged in (i+1)-th to m-th rows.

In an embodiment of the invention, a driving method of a display device includes applying write scan signals, data voltages, and compensation scan signals to pixels arranged in m rows and n columns, where the applying the write scan signals, the data voltages, and the compensation scan signals to the pixels includes: applying the data voltages to the pixels arranged in first to m-th rows in a first frame; applying the data voltages to pixels arranged in first to i-th rows in h-th to p-th frames; applying the data voltages to pixels of a row unit by increasing sequentially a number of the row unit to which the data voltages are applied in at least one row unit from an i-th row to an (i+1)-th row in h-th to (h+k)-th frames; applying the data voltages to the pixels of the row unit by decreasing sequentially the number of the row unit to which the data voltages are applied in at least one row unit from the (i+1)-th row to the i-th row in (h+k)-th to (h+2k)-th frames; and not applying the compensation scan signals to pixels arranged in (i+1)-th to m-th rows in the h-th to p-th frames.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
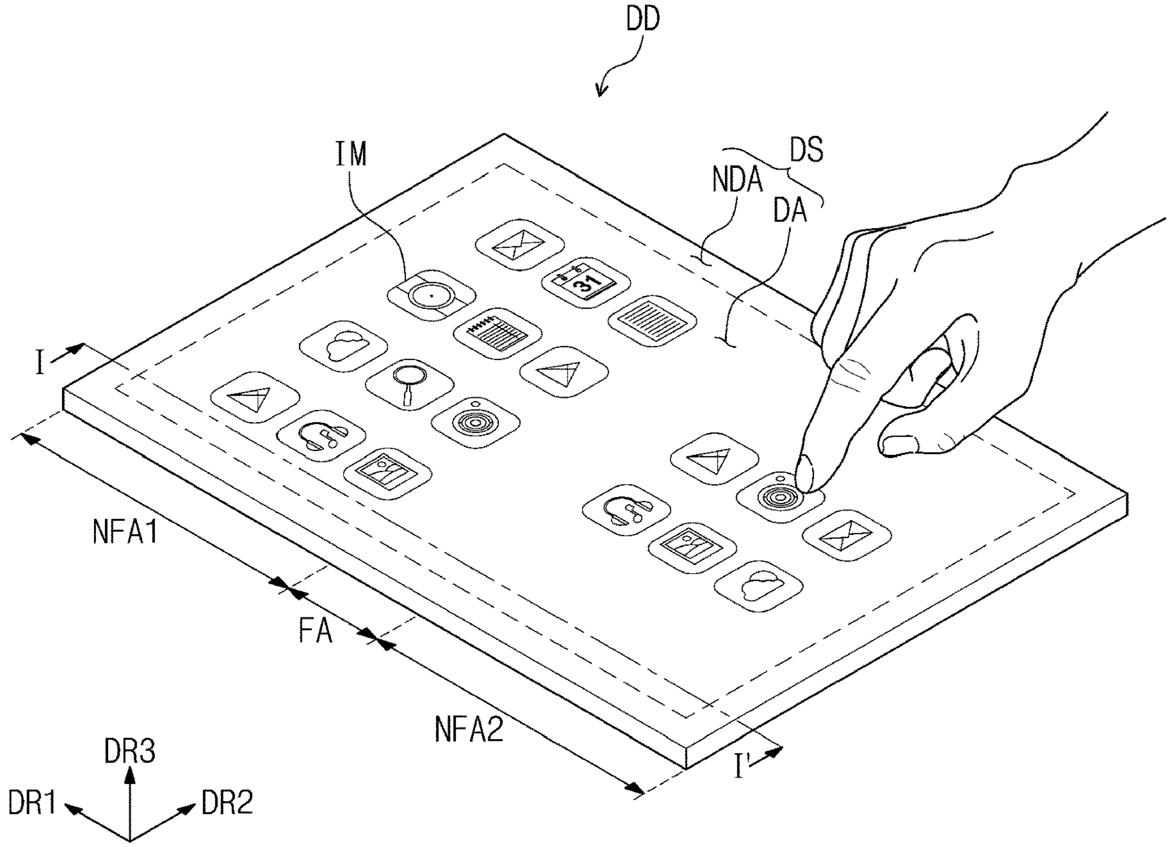
FIG. 1 is a perspective view of a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when an element (or region, layer, part, etc.) is referred to as being "on", "connected to", or "coupled to" another element, it means that it can be directly placed on/connected to/coupled to other components, or a third component can be arranged between them.

Like reference numerals refer to like elements. Additionally, in the drawings, the thicknesses, proportions, and dimensions of components are exaggerated for effective description.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that the terms "first" and "second" are used herein to describe various components but these components should not be limited by these terms. The above terms are used only to distinguish one component from another. For example, a first component may be referred to as a second component and vice versa without departing from the scope of the invention. The terms of a singular form may include plural forms unless otherwise specified.

In addition, terms such as "below", "the lower side", "on", and "the upper side" are used to describe a relationship of configurations shown in the drawing. The terms are described as a relative concept based on a direction shown in the drawing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. In addition, terms defined in a commonly used dictionary should be interpreted as having a meaning consistent with the meaning in the context of the related technology, and unless interpreted in an ideal or overly formal sense, the terms are explicitly defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2:
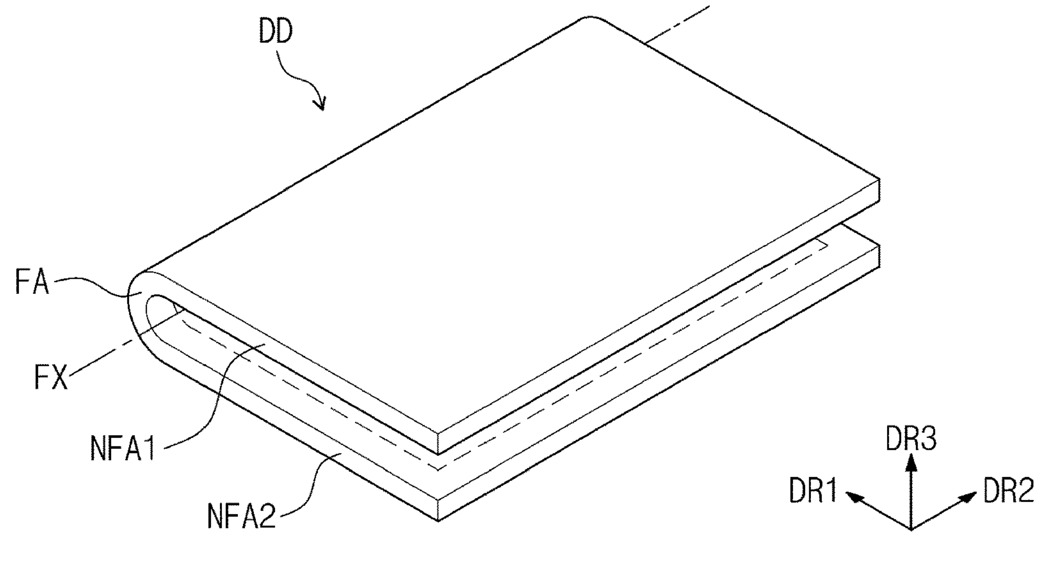
FIG. 2 is a diagram illustrating the display device illustrated in FIG. 1 in a folded state.

FIG. 1 is a perspective view of a display device according to an embodiment of the invention. FIG. 2 is a diagram illustrating the display device illustrated in FIG. 1 in a folded state.

Referring to FIG. 1, an embodiment of a display device DD according to the invention may have a rectangular shape with long sides extending in a first direction DR1 and short sides extending in a second direction DR2 intersecting the first direction DR1. However, the invention is not limited thereto, and the display device DD may have one of various shapes such as a circle and a polygon. The display device DD may be a flexible display device.

Hereinafter, the direction substantially perpendicular to the plane defined by the first direction DR1 and the second direction DR2 or a thickness direction of the display device DD is defined as a third direction DR3. In addition, in this specification, the meaning of "when viewed from a plane" may mean a state viewed from the third direction DR3.

The display device DD may include a folding area FA and a plurality of non-folding areas NFA1 and NFA2. The non-folding areas NFA1 and NFA2 may include a first non-folding area NFA1 and a second non-folding area NFA2. The folding area FA may be disposed between the first non-folding area NFA1 and the second non-folding area NFA2. The folding area FA, the first non-folding area NFA1, and the second non-folding area NFA2 may be arranged in the first direction DR1.

In one embodiment, for example, a single folding area FA and the two non-folding areas NFA1 and NFA2 are defined as illustrated in FIG. 1, but the number of folding area FA and non-folding areas NFA1 and NFA2 is not limited thereto. In one alternative embodiment, for example, the display device DD may include more than two non-folding areas and a plurality of folding areas disposed between the non-folding areas.

The upper surface of the display device DD may be defined as the display surface DS and may have a plane defined by the first direction DR1 and the second direction DR2. The images IM generated by the display device DD may be provided to the user through the display surface DS.

The display surface DS may include a display area DA and a non-display area NDA around the display area DA. The display area DA may display an image, and the non-display area NDA may not display an image. The non-display area NDA may surround the display area DA and may define an outline portion of the display device DD and be printed in a predetermined color.

Referring to FIG. 2, an embodiment of the display device DD may be a foldable display device DD that is folded or unfolded. In one embodiment, for example, the folding area FA may be bent based on the folding axis FX parallel to the second direction DR2, so that the display device DD may be folded. The folding axis FX may be defined as a short axis parallel to the short side of the display device DD.

When the display device DD is folded, the first non-folding area NFA1 and the second non-folding areas NFA2 face each other, and the display device DD may be in-folded to prevent the display surface DS from being exposed to the outside.

The display device DD may be used in large electronic devices such as a television, a monitor, or an external advertisement board. In addition, the display device DD may be used in small and medium-sized electronic devices such as a personal computer ("PC"), a notebook computer, a personal digital terminal, a car navigation system, a game machine, a smart phone, a tablet PC, or a camera. However, these are merely exemplary, and may be used in other electronic devices without departing from the teaching of the invention.

In embodiments of the invention, as described above, the display device DD may be a foldable display, but is not limited thereto, and alternatively, may be implemented as a rollable display device and a slider display device.

Figure 3:
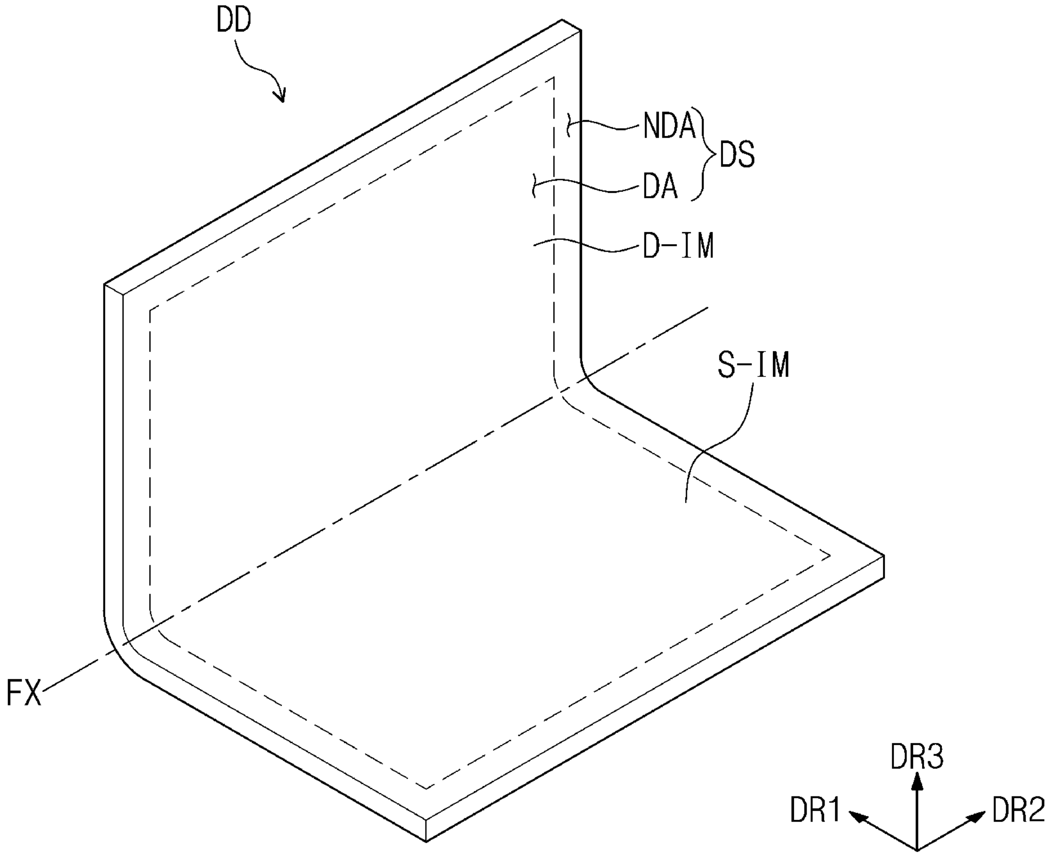
FIG. 3 is a diagram illustrating an image display portion of the display device in the folded state illustrated in FIG. 2.

FIG. 3 is a diagram illustrating an image display portion of the display device in a folded state illustrated in FIG. 2.

Referring to FIG. 3, the display device DD may be folded around the folding axis FX. In one embodiment, for example, the display device DD may be folded at about 90 degrees, but the folding angle of the display device DD is not limited thereto.

The display device DD may include a moving image unit D-IM for displaying a moving image and a still image unit S-IM for displaying a still image. In one embodiment, for example, the moving image unit D-IM may display an image that changes in real time, such as a movie, and the still image unit S-IM may display images that do not move nor change, such as a keyboard.

The display device DD may be driven at a predetermined driving frequency. The moving image unit D-IM may receive continuously updated images during the driving frequency. The still image unit S-IM may maintain image data initially provided during the driving frequency, and then may not receive an image signal.

In an embodiment of the invention, the driving frequency may be set to 120 hertz (Hz). The display device DD driven at 120 Hz may operate at 120 frames per second. The display device DD may receive an image signal for 120 frames per second.

The moving image unit D-IM may receive continuously updated image signals for 120 frames. The still image unit S-IM may receive an initial image signal in the first frame. Thereafter, the still image unit S-IM is not provided with image signals and may maintain the received image signal up to 120 frames.

Accordingly, in an embodiment, the moving image unit D-IM may be driven at 120 Hz, and the still image unit S-IM may be driven at 1 Hz. In such an embodiment of the invention, the moving image unit D-IM may be driven at a high frequency, and the still image unit S-IM may be driven at a low frequency lower than the high frequency.

Figure 4:
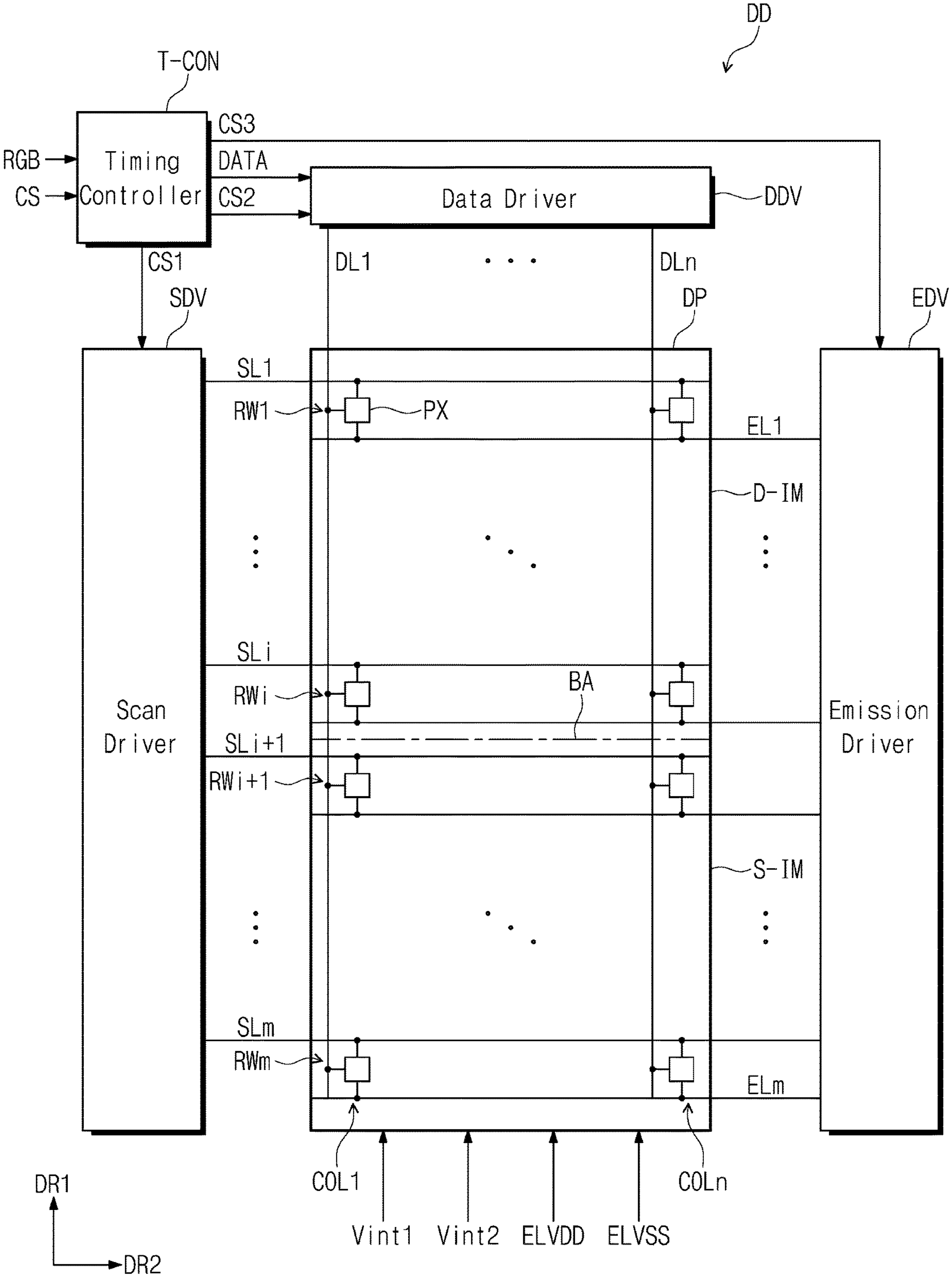
FIG. 4 is a block diagram of the display device shown in FIG. 1.

FIG. 4 is a block diagram of the display device shown in FIG. 1.

Referring to FIG. 4, the display device DD includes a display panel DP, a scan driver SDV, a data driver DDV, an emission driver EDV, and a timing controller T-CON. The display panel DP may include a plurality of pixels PX, a plurality of scan lines SL1 to SLm, a plurality of data lines DL1 to DLn, and a plurality of emission lines EL1 to ELm. Here, m and n are natural numbers.

Each of the scan lines SL1 to SLm may include a write scan line, a compensation scan line, and an initialization scan line. The write scan line, the compensation scan line, and the initialization scan line will be described later in detail with reference to FIG. 5.

An embodiment of the display panel DP according to the invention may be a light emitting display panel. In one embodiment, for example, the display panel DP may be an organic light emitting display panel or a quantum dot light emitting display panel. In an embodiment where the display panel DP is the organic light emitting display panel, the light emitting layer may include an organic light emitting material. The light emitting layer of the quantum dot light emitting display panel may include quantum dot, quantum rod, and the like. Hereinafter, for convenience of description, embodiments where the display panel DP is an organic light emitting display panel will be described in detail.

An embodiment of the display panel DP may include a moving image unit D-IM for displaying a moving image and a still image unit S-IM for displaying a still image. A plurality of pixels PX may be provided to each of the moving image unit D-IM and the still image unit S-IM.

The pixels PX may be arranged in a matrix from with m rows RW1 to RWm and n columns COL1 to COLn. The m rows RW1 to RWm may correspond to the second direction DR2, and the n columns COL1 to COLn may correspond to the first direction DR1.

The pixels PX arranged in the first row RW1 to the i-th row RWi may be disposed in a moving image unit D-IM to display a moving image. The pixels PX arranged in the (i+1)-th row RWi+1 to the m-th row RWm may be disposed in the still image unit S-IM to display a still image. Here, i is a natural number, and i may be less than m.

The scan lines SL1 to SLm may extend in the second direction DR2 and may be connected to the pixels PX and the scan driver SDV. The data lines DL1 to DLn may extend in the first direction DR1 to be connected to the pixels PX and the data driver DDV. The emission lines EL1 to ELm may extend in the second direction DR2 to be connected to the pixels PX and the emission driver EDV.

A first voltage ELVDD and a second voltage ELVSS having a lower level than the first voltage ELVDD may be applied to the display panel DP. The first voltage ELVDD and the second voltage ELVSS may be applied to the pixels PX. Although not shown in the drawing, the display device DD may further include a voltage generation unit for generating the first voltage ELVDD and the second voltage ELVSS.

A first initialization voltage Vint1 and a second initialization voltage Vint2 may be applied to the display panel DP. The first initialization voltage Vint1 and the second initialization voltage Vint2 may be applied to the pixels PX. The first initialization voltage Vint1 and the second initialization voltage Vint2 may be generated by the voltage generation unit.

The timing controller T-CON may receive image signals RGB from an external device (e.g., a system board). The timing controller T-CON may generate image data DATA by converting the data format of the image signals RGB to meet the data driver DDV and interface specifications. The timing controller T-CON may provide the image data DATA having the converted data format to the data driver DDV.

The timing controller T-CON may receive the control signal CS from an external device (e.g., the system board). The timing controller T-CON may generate and output the first control signal CS1, the second control signal CS2, and the third control signal CS3 in response to the control signal CS provided from the outside.

The first control signal CS1 may be defined as a scan control signal, the second control signal CS2 may be defined as a data control signal, and the third control signal CS3 may be defined as an emission control signal. The first control signal CS1 may be provided to the scan driver SDV, the second control signal CS2 may be provided to the data driver DDV, and the third control signal CS3 may be provided to the emission driver EDV.

The scan driver SDV may generate a plurality of scan signals in response to the first control signal CS1. The scan signals may be applied to the pixels PX through the scan lines SL1 to SLm.

The data driver DDV may generate a plurality of data voltages corresponding to the image data DATA in response to the second control signal CS2. The data voltages may be applied to the pixels PX through the data lines DL1 to DLn.

The emission driver EDV may generate a plurality of emission signals in response to the third control signal CS3.

The emission signals may be applied to the pixels PX through the emission lines EL1 to ELm.

The pixels PX may be provided with the data voltages in response to the scan signals. The pixels PX may display an image by emitting light having luminance corresponding to data voltages in response to emission signals. The emission time of the pixels PX may be controlled by emission signals.

Figure 5:
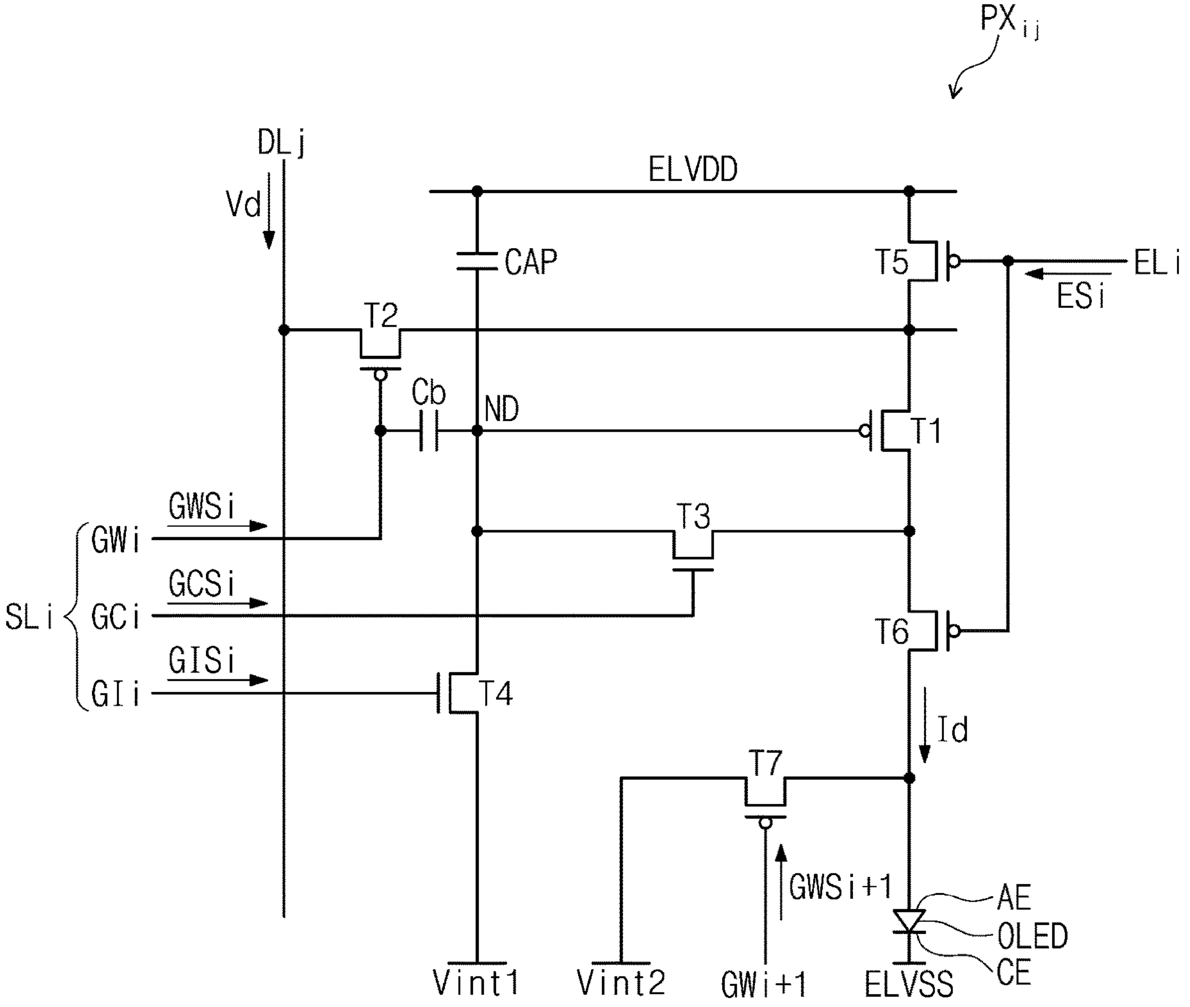
FIG. 5 is a diagram illustrating an equivalent circuit of a pixel shown in FIG. 4.
Figure 6:
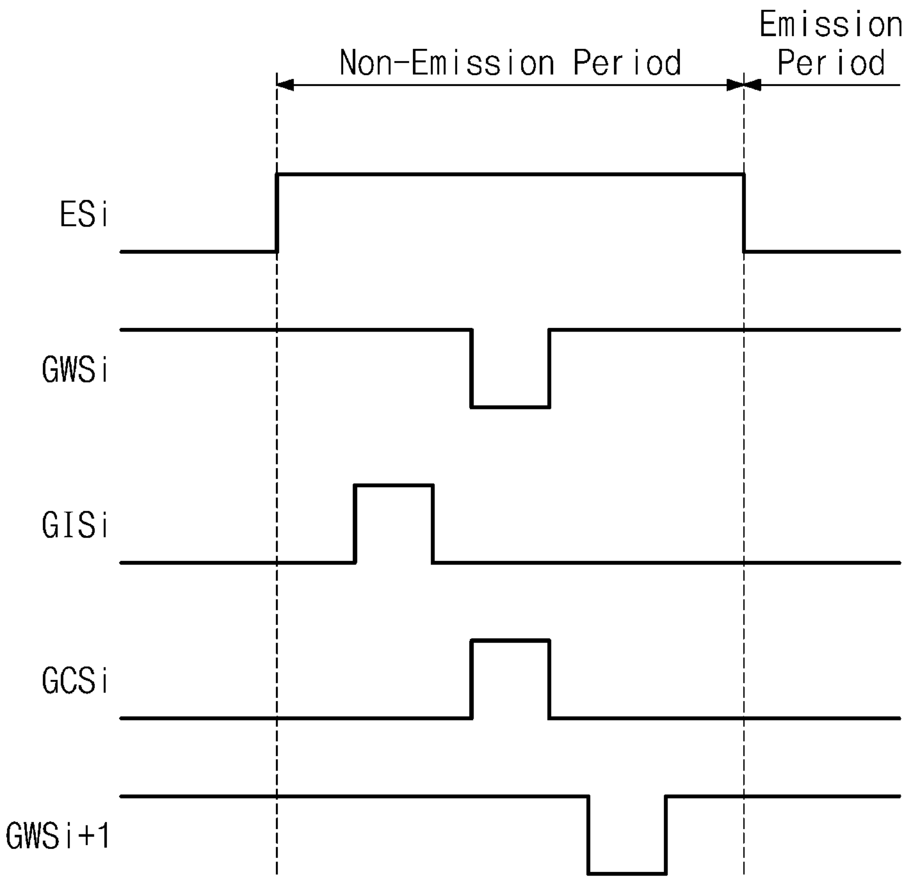
FIG. 6 is a timing diagram of signals for driving the pixel shown in FIG. 4.

FIG. 5 is a diagram illustrating an equivalent circuit of a pixel shown in FIG. 4. FIG. 6 is a timing diagram of signals for driving the pixel shown in FIG. 4.

In FIG. 5, a pixel PXij connected to an i-th scan line SLi, an i-th emission line ELi, and a j-th data line DLj is illustrated. Here, i and j are natural numbers, and i may be less than m.

Referring to FIG. 5, an embodiment of the pixel PXij may include a light emitting element OLED, a plurality of transistors T1 to T7, a capacitor CAP, and a boosting capacitor Cb. The transistors T1 to T7, the capacitor CAP, and the boosting capacitor Cb may control the amount of current flowing through the light emitting element OLED based on the data voltage Vd. The light emitting element OLED may generate light having a predetermined luminance corresponding to a received amount of current.

The i-th scan line SLi may include an i-th write scan line GWi, an i-th compensation scan line GCi, and an i-th initialization scan line GIi. The i-th write scan line GWi may receive the i-th write scan signal GWSi, the i-th compensation scan line GCi may receive the i-th compensation scan signal GCSi, and the i-th initialization scan line GIi may receive an i-th initialization scan signal GISi.

Each of the transistors T1 to T7 may include a source electrode, a drain electrode, and a gate electrode. Hereinafter, for convenience of description, one of the source electrode and the drain electrode will be referred to as a first electrode, and the other of the source electrode and the drain electrode will be defined as a second electrode. Further, the gate electrode is defined as a control electrode.

The transistors T1 to T7 may include first to seventh transistors T1 to T7. The first, second, fifth, sixth, and seventh transistors T1, T2, T5, T6, and T7 may be p-type metal-oxide-semiconductor ("PMOS") transistors. The third and fourth transistors T3 and T4 may be n-type metal-oxide-semiconductor ("NMOS") transistors.

The first transistor T1 may be defined as a driving transistor, and the second transistor T2 may be defined as a switching transistor. The third transistor T3 may be defined as a compensation transistor.

The fourth transistor T4 and the seventh transistor T7 may be defined as initialization transistors. The fifth and sixth transistors T5 and T6 may be defined as emission control transistors.

The light emitting element OLED may be defined as an organic light emitting element. The light emitting element OLED may include an anode AE and a cathode CE. The anode AE may receive the first voltage ELVDD through the sixth, first, and fifth transistors T6, T1, and T5. The cathode CE may receive the second voltage ELVSS.

The first transistor T1 may be connected between the fifth transistor T5 and the sixth transistor T6. The first transistor T1 may include a first electrode that receives the first voltage ELVDD through the fifth transistor T5, a second electrode connected to the anode AE through the sixth transistor T6, and a control electrode connected to a node ND.

The first electrode of the first transistor T1 may be connected to the fifth transistor T5, and the second electrode of the first transistor T1 may be connected to the sixth transistor T6. The first transistor T1 may control an amount of current flowing through the light emitting element OLED based on a voltage applied to the control electrode of the first transistor T1.

The second transistor T2 may be connected between the j-th data line DLj and the first electrode of the first transistor T1. The second transistor T2 may include a first electrode connected to the j-th data line DLj, a second electrode connected to the first electrode of the first transistor T1, and a control electrode connected to the i-th write scan line GWi.

The second transistor T2 is turned on by the i-th write scan signal GWSi applied through the i-th write scan line GWi to electrically connect the data line DLj and the first electrode of the first transistor T1. The second transistor T2 may perform a switching operation of providing the data voltage Vd applied through the j-th data line DLj to the first electrode of the first transistor T1.

The third transistor T3 may be connected between the second electrode of the first transistor T1 and the node ND. The third transistor T3 may include a first electrode connected to the second electrode of the first transistor T1, a second electrode connected to the node ND, and a control electrode connected to the i-th compensation scan line GCi.

The third transistor T3 is turned on by the i-th compensation scan signal GCSi applied through the i-th compensation scan line GCi to electrically connect the second electrode of the first transistor T1 and the control electrode of the first transistor T1. When the third transistor T3 is turned on, the first transistor T1 and the third transistor T3 may be connected in a diode form.

The fourth transistor T4 may be connected to the node ND. The fourth transistor T4 may include a first electrode connected to the node ND, a second electrode to which the first initialization voltage Vint1 is applied, and a control electrode connected to the i-th initialization scan line GIi. The fourth transistor T4 may be turned on by an i-th initialization scan signal GISi applied through the i-th initialization scan line GIi to provide the first initialization voltage Vint1 to the node ND.

The fifth transistor T5 may include a first electrode that receives a first voltage ELVDD, a second electrode connected to the first electrode of the first transistor T1, and a control electrode connected to the i-th emission line ELi.

The sixth transistor T6 may include a first electrode connected to the second electrode of the first transistor T1, a second electrode connected to the anode AE, and a control electrode connected to the i-th emission line ELi.

The fifth and sixth transistors T5 and T6 may be turned on by the i-th emission signal ESi applied through the i-th emission line ELi. The first voltage ELVDD is provided to the light emitting element OLED by the turned-on fifth transistor T5 and sixth transistor T6, so that a driving current Id may flow through the light emitting element OLED. Accordingly, the light emitting element OLED emits light.

The seventh transistor T7 may include a first electrode connected to the anode AE, a second electrode that receives the second initialization voltage Vint2, and a control electrode connected to the (i+1)-th write scan line GWi+1. The (i+1)-th write scan line GWi+1 may be defined as a write scan line of the next stage of the i-th write scan line GWi.

The seventh transistor T7 is turned on by the (i+1)-th write scan signal GWSi+1 applied through the (i+1)-th write scan line GWi+1 to provide the second initialization voltage Vint2 to the anode AE of the light emitting element OLED. In an alternative embodiment of the invention, the seventh transistor T7 may be omitted. In an embodiment of the invention, the second initialization voltage Vint2 may have a same level as the first initialization voltage Vint1, but is not limited thereto and may have a different level from the first initialization voltage Vint1.

The capacitor CAP may include a first electrode that receives the first voltage ELVDD and a second electrode connected to the node ND. When the fifth transistor T5 and the sixth transistor T6 are turned on, the amount of current flowing through the first transistor T1 may be determined based on the voltage stored in the capacitor CAP.

The boosting capacitor Cb may include a first electrode connected to the j-th write scan line GWi and a second electrode connected to the node ND. The boosting capacitor Cb may increase the voltage of the node ND after the voltage is charged in the capacitor CAP.

Hereinafter, the operation of the pixel PXij will be described in greater detail with reference to the timing diagram of FIG. 6.

Referring to FIGS. 5 and 6, the i-th emission signal ESi may have a high level during a non-emission period and a low level during the emission period.

Each activation section of the i-th write scan signal GWSi and the (i+1)-th write scan signal GWSi+1 may be defined by a low level of each of the i-th write scan signal GWSi and the (i+1)-th write scan signal GWSi+1. The activation section of each of the i-th compensation scan signal GCSi and the i-th initialization scan signal GISi may be defined by a high level of each of the i-th compensation scan signal GCSi and the i-th initialization scan signal GISi.

After the i-th initialization scan signal GISi is activated, the i-th write scan signal GWSi and the i-th compensation scan signal GCSi may be activated. Thereafter, the (i+1)-th write scan signal GWSi+1 may be activated. The i-th write scan signal GWSi overlaps the i-th compensation scan signal GCSi to have a same timing as each other.

During the non-emission period, an i-th initialization scan signal GISi, an i-th write scan signal GWSi, an i-th compensation scan signal GCSi, and an (i+1)-th write scan signal GWSi+1, each activated, may be applied to the pixel PXij. The i-th initialization scan signal GISi may be applied to the pixel PXij before the i-th write scan signal GWSi and the i-th compensation scan signal GCSi.

Hereinafter, an operation in which each signal is applied to a corresponding transistor may mean an operation in which an activated signal is applied to the transistor.

The i-th initialization scan signal GISi is applied to the fourth transistor T4 so that the fourth transistor T4 may be turned on. The first initialization voltage Vint1 may be provided to the node ND through the fourth transistor T4. Accordingly, the first initialization voltage Vint1 may be applied to the control electrode of the first transistor T1, and the first transistor T1 may be initialized by the first initialization voltage Vint1.

Thereafter, the i-th write scan signal GWSi is applied to the second transistor T2 so that the second transistor T2 may be turned on. Also, the i-th compensation scan signal GCSi may be applied to the third transistor T3 to turn on the third transistor T3.

Accordingly, the first transistor T1 and the third transistor T3 may be connected to each other in a diode from. In this case, a compensation voltage (Vd-Vth) generated by subtracting the threshold voltage (Vth) of the first transistor T1 from the data voltage Vd supplied through the data line DLj may be applied to the control electrode of the first transistor T1.

The first voltage ELVDD and the compensation voltage (Vd-Vth) may be applied to the first electrode and the second electrode of the capacitor CAP, respectively. Charges corresponding to a voltage difference between the voltage of the first electrode and the voltage of the second electrode may be stored in the capacitor CAP.

After a predetermined voltage is charged in the capacitor CAP, the i-th write scan signal GWSi may be deactivated. In this case, the i-th write scan signal GWSi may rise from a low-level voltage to a high-level voltage. When the voltage level of the i-th write scan signal GWSi increases, the voltage of the node ND increases by the boosting capacitor Cb, and accordingly, an image of a desired gradation may be displayed.

In an embodiment, the data voltage Vd is provided to the pixel PXij through the j-th data line DLj, and the data voltage Vd provided to the pixel PXij may be set to a voltage lower than the desired voltage by the parasitic capacitor caused by the data line DLj and the resistance of the data line DLj. Accordingly, in an embodiment of the invention, a desired gradation may be implemented by increasing the voltage of the node ND using the boosting capacitor Cb.

The (i+1)-th write scan signal GWSi+1 is applied to the seventh transistor T7 so that the seventh transistor T7 may be turned on. A second initialization voltage Vint2 may be provided to the anode AE through the seventh transistor T7. Accordingly, the anode AE may be initialized with the second initialization voltage Vint2.

Thereafter, during the emission period, the i-th emission signal ESi is applied to the fifth transistor T5 and the sixth transistor T6 through the i-th emission line ELi, so that the fifth transistor T5 and the sixth transistor T6 may be turned on. In this case, a driving current Id corresponding to a voltage difference between the voltage of the control electrode of the first transistor T1 and the first voltage ELVDD may be generated. The driving current Id is provided to the light emitting element OLED through the sixth transistor T6 so that the light emitting element OLED can emit light.

During the emission period, by the capacitor CAP, the gate-source voltage (Vgs) of the first transistor T1 may be defined as a voltage difference between the first voltage ELVDD and the compensation voltage (Vd-Vth) as shown in Equation 1 below.

$$Vgs=ELVDD-(Vd-Vth) \qquad \text{[Equation 1]}$$

The relationship between the current and voltage of the first transistor T1 is shown in Equation 2 below. Equation 2 is a general current and voltage relationship of a transistor.

$$Id=(1/2)\mu Cox(W/L)(Vgs-Vth)^2 \qquad \text{[Equation 2]}$$

When Equation 1 is substituted into Equation 2, the threshold voltage (Vth) is removed, and the driving current Id may be proportional to a square value $(ELVDD-Vd)^2$ of a value obtained by subtracting the data voltage Vd from the first voltage ELVDD. Accordingly, the driving current Id may be determined regardless of the threshold voltage Vth of the first transistor T1. This operation may be defined as a threshold voltage compensation operation.

Figure 7:
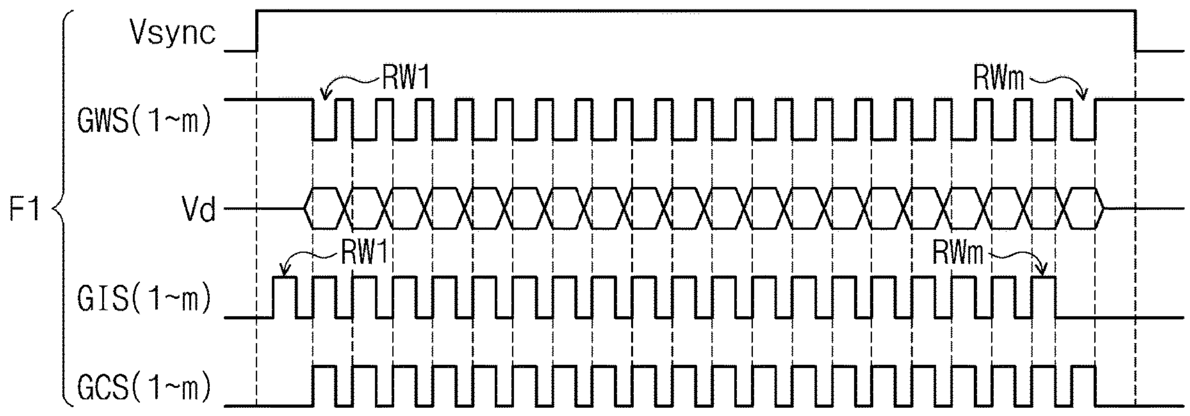
FIG. 7 is a diagram illustrating timing of signals and data voltages applied to pixels during a first frame.
Figure 8:
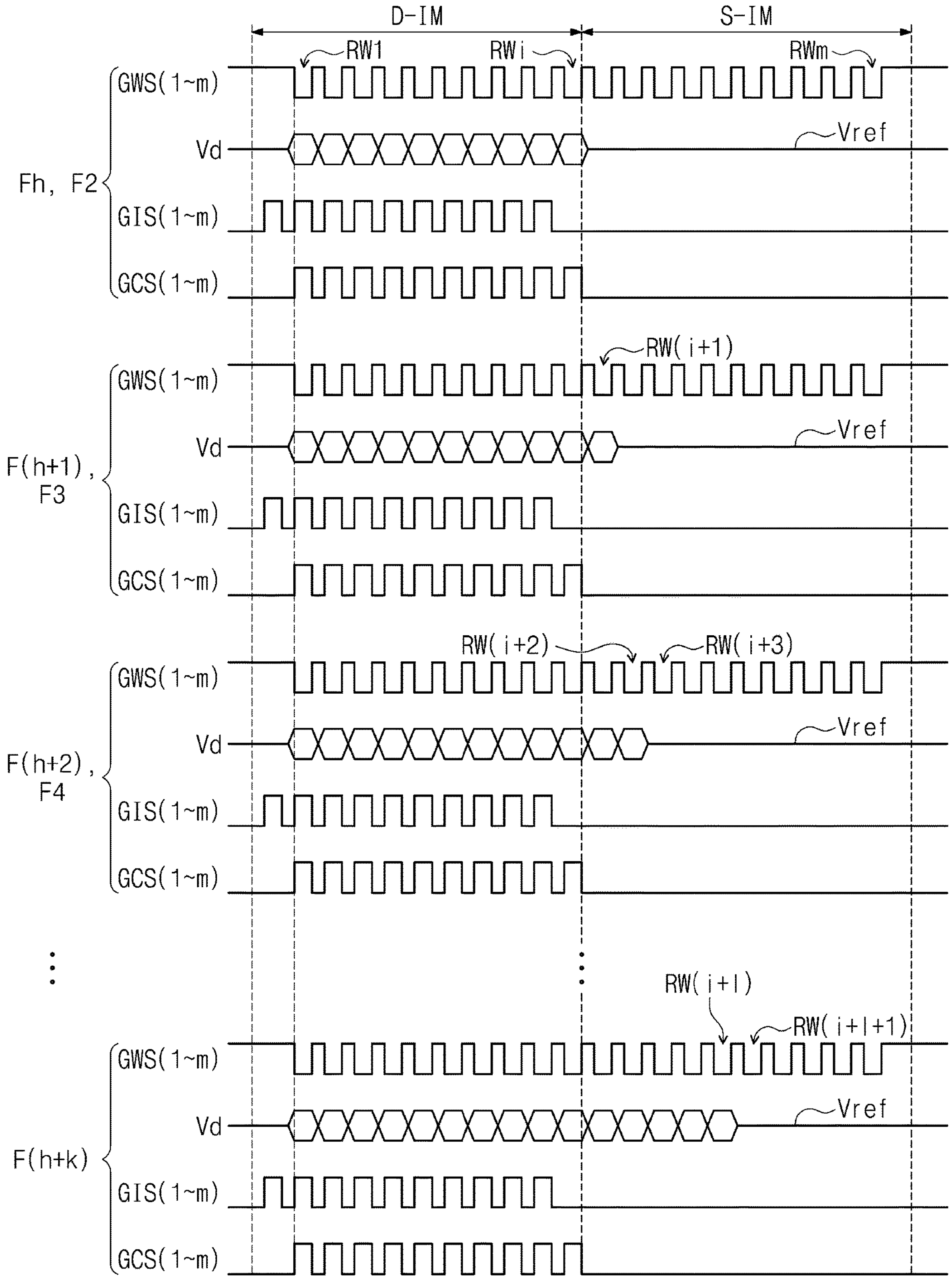
FIG. 8 is a diagram illustrating timings of signals and data voltages applied to pixels during h-th to (h+k)-th frames.
Figure 9:
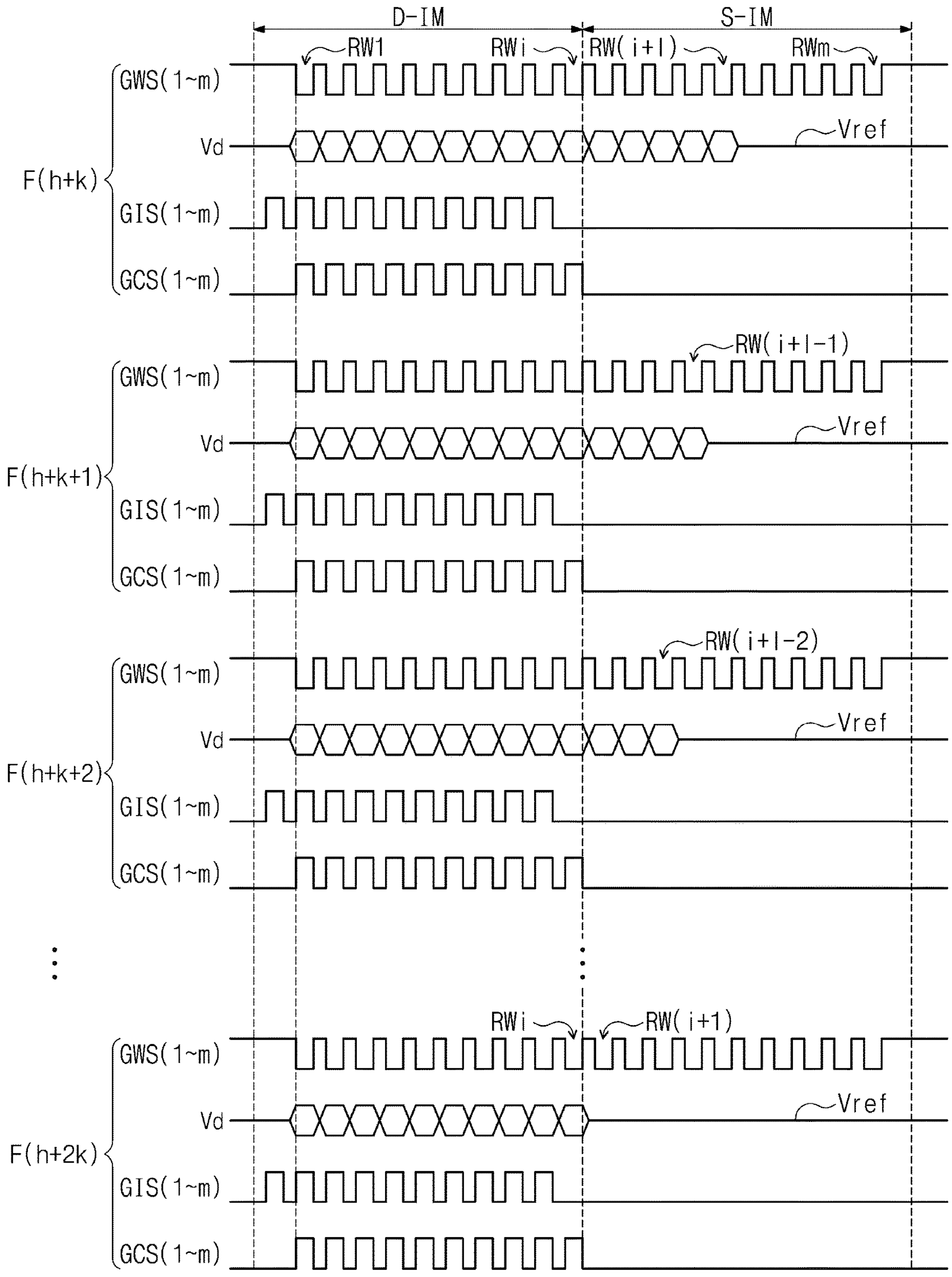
FIG. 9 is a diagram illustrating timings of signals and data voltages applied to pixels during (h+k)-th to (h+2k)-th frames.
Figure 10:
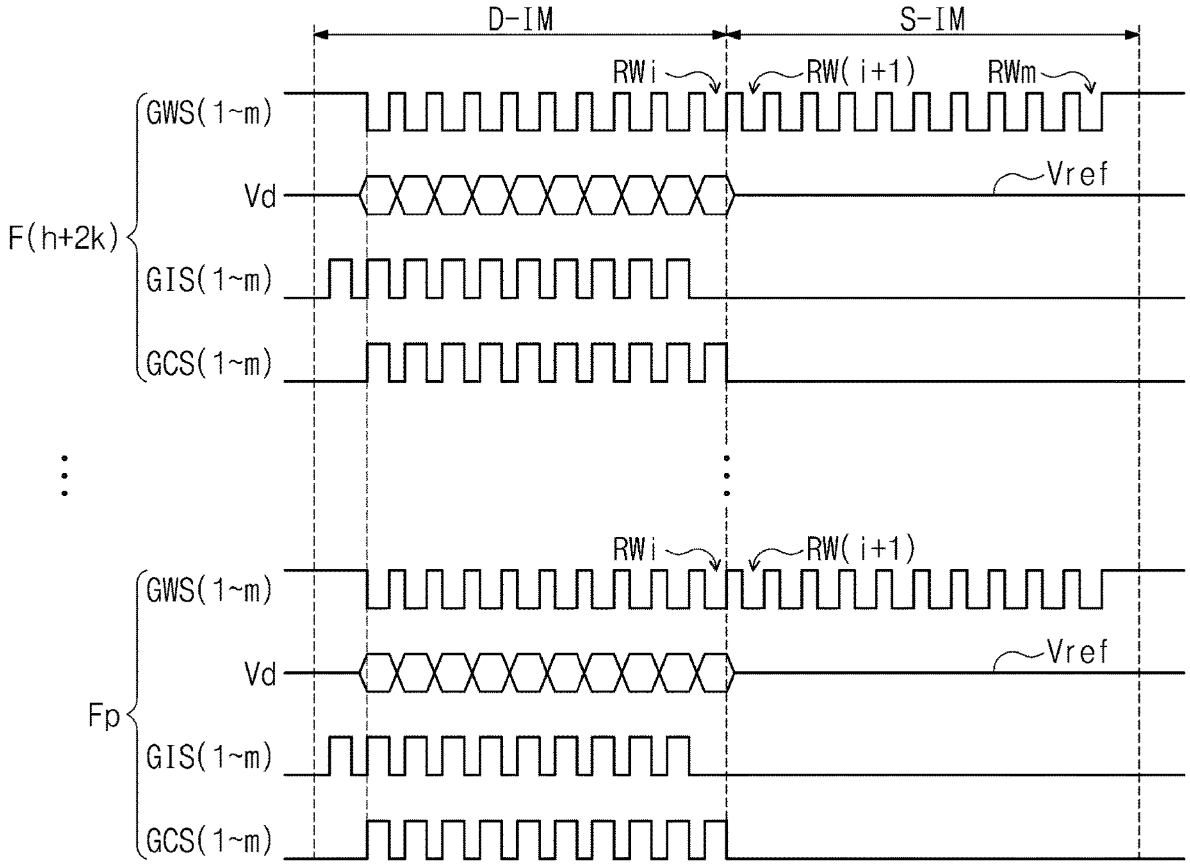
FIG. 10 is a diagram illustrating timings of signals and data voltages applied to pixels during (h+2k)-th to p-th frames.

FIG. 7 is a diagram illustrating timing of signals and data voltages applied to pixels during a first frame. FIG. 8 is a diagram illustrating timings of signals and data voltages applied to pixels during h-th to (h+k)-th frames. FIG. 9 is a diagram illustrating timings of signals and data voltages applied to pixels during (h+k)-th to (h+2k)-th frames. FIG. 10 is a diagram illustrating timings of signals and data voltages applied to pixels during (h+2k)-th to p-th frames.

Hereinafter, the operation of the pixel shown in FIG. 5 based on the signals shown in FIGS. 7 to 10 will be described. FIGS. 7 to 10 are timing diagrams of signals from the first frame F1 to the p-th frame Fp, that is, the last frame.

Referring to FIGS. 5 and 7, the vertical start signal Vsync is a signal corresponding to one frame, and write scan signals GWS(1 to m), initialization scan signals GIS(1 to m), compensation scan signals GCS(1 to m) and data Voltages Vd may be applied to the pixels PX in synchronization with the vertical start signal Vsync. In FIGS. 8 to 10, for convenience of illustration, the vertical start signal Vsync is omitted.

The write scan signals GWS(1 to m) may include a first write scan signal GWS1 to an m-th write scan signal GWSm. The initialization scan signals GIS(1 to m) may include a first initialization scan signal GIS1 to an m-th initialization scan signal GISm. The compensation scan signals GCS(1 to m) may include a first compensation scan signal GCS1 to an m-th compensation scan signal GCSm.

The write scan signals GWS(1 to m) may be sequentially applied to the write scan lines of the scan lines SL1 to SLm, respectively, to be provided to the pixels PX. The initialization scan signals GIS(1 to m) may be sequentially applied to the initialization scan lines of the scan lines SL1 to SLm, respectively, to be provided to the pixels PX. The compensation scan signals GCS(1 to m) may be sequentially applied to the compensation scan lines of the scan lines SL1 to SLm, respectively, to be provided to the pixels PX.

In the first frame F1, write scan signals GWS(1 to m), initialization scan signals GIS(1 to m), and compensation scan signals GCS(1 to m) may be sequentially provided in row units to the pixels PX arranged in the first to m-th rows RW1 to RWm. In the first frame F1, the data voltages Vd may be provided to the pixels PX of the first to m-th rows RW1 to RWm.

Referring to FIGS. 5, 7, and 8, the h-th frame Fh may be any one frame after the first frame F1. Here, h is a natural number greater than 1. Write scan signals GWS(1 to m), initialization scan signals GIS(1 to m), compensation scan signals GCS(1 to m), and data voltages Vd may be provided to the pixels PX arranged in first to m-th rows RW1 to RWm from the first frame F1 to the (h−1)-th frame F(h−1).

If h is 2, write scan signals GWS(1 to m), initialization scan signals GIS(1 to m), compensation scan signals GCS(1 to m), and data voltages Vd may be provided to the pixels PX arranged in the first to m-th rows RW1 to RWm in the first frame F1. In subsequent frames, the initialization scan signals GIS(1 to m), the compensation scan signals GCS(1 to m), and the data voltages Vd may be provided to the pixels PX arranged in predetermined rows among the first to m-th rows RW1 to RWm. This operation will be described in detail below.

Referring to FIGS. 5 and 7 to 10, in an embodiment of the invention, the pixels PX may be driven during p frames. Here, p is a natural number. In one embodiment, for example, p frames may be defined as 120 frames. For each of the first to p-th frames F1 to Fp, the write scan signals GWS(1 to m) may be sequentially applied in row units to the pixels PX arranged in the first to m-th rows RW1 to RWm.

In the h-th to p-th frames Fh to Fp, the compensation scan signals GCS(1 to m) and the initialization scan signals GIS(1 to m) may not be applied to the pixels PX arranged in the (i+1)-th to m-th rows RW(i+1) to RWm. Accordingly, in the h-th to p-th frames Fh to Fp, the third and fourth transistors T3 and T4 of the pixels PX may be turned off.

In the h-th to p-th frames Fh to Fp, the data voltages Vd may be applied to the pixels PX arranged in the first to i-th rows RW1 to RWi. In the h-th frame Fh, the data voltages Vd may not be applied to the pixels PX arranged in the (i+1)-th to m-th rows RW(i+1) to RWm.

Referring to FIG. 8, in the h-th to (h+k)-th frames Fh to F(h+k), the data voltages Vd may be applied to the pixels PX of a row unit by increasing sequentially the number of the row unit to which the data voltages Vd are applied in at least one row unit from the i-th row RWi to the (i+1)-th row RW(i+1), and may not be applied to the remaining rows. k and 1 are natural numbers. Here, (h+k) may be less than p.

In one embodiment, for example, as shown in FIG. 8, data voltages are applied to 5 rows, that is, 1 is 5, but the value of 1 is not limited thereto.

Referring to FIG. 9, in the (h+k)-th to (h+2k)-th frames F(h+k) to F(h+2k), the data voltages Vd may be applied to the pixels PX of each row by decreasing sequentially the number of the row unit to which the data voltages Vd are applied in at least one row unit from the (i+1)-th row RW(i+1) to the i-th row RWi, and may not be applied to the remaining rows.

Referring to FIGS. 8 to 10, in the (h+2k)-th to p-th frames F(h+2k) to Fp, the data voltages Vd may be applied to the pixels PX arranged in the first to i-th rows RW1 to RWi, and may not be applied to the pixels PX arranged in the (i+1)-th to m-th rows RW(i+1) to RWm.

After the first frame F1, in the still image unit S-IM, the number of rows, to which the data voltages Vd are applied, increases sequentially until a specific frame, and after the specific frame, decreases sequentially, and then the data voltages Vd may be applied only to the moving image unit D-IM until the last frame Fp. The number of rows to which the data voltages Vd are applied may decrease until the (h+2k)-th frame F(h+2k), and the data voltages Vd may be applied only to the moving image unit D-IM from the (h+2k)-th frame F(h+2k) to the last frame Fp.

In an embodiment, where h is 2 as shown in FIG. 8, in the second frame F2, the data voltages Vd may be applied to the pixels PX arranged in the first to i-th rows RW1 to RWi, and may not be applied to the pixels PX arranged in the remaining rows RW(i+1) to RWm.

In the third frame F3, the data voltages Vd may be applied to the pixels PX arranged in the first to (i+1)-th rows RW1 to RW(i+1), and may not be applied to the pixels PX arranged in the remaining rows RW(i+2) to RWm. In the third frame F3 rather than the second frame F2, the data voltages Vd may be further provided to the pixels PX in one row.

In the fourth frame F4, the data voltages Vd may be applied to the pixels PX arranged in the first to (i+2)-th rows RW1 to RW(i+2), and may not be applied to the pixels PX arranged in the remaining rows RW(i+3) to RWm. In the fourth frame F4 rather than the third frame F3, the data voltages Vd may be further provided to the pixels PX in one row. This operation may be performed until the (h+k)-th frame F(h+k).

In the (h+k)-th frame F(h+k), the data voltages Vd may be applied to the pixels PX arranged in the first to (i+1)-th rows RW1 to RW(i+1), and may not be applied to the pixels PX arranged in the remaining rows RW(i+1+1) to RWm.

In the (h+k+1)-th frame F(h+k+1), the data voltages Vd may be applied to the pixels PX arranged in the first to (i+1−1)-th rows RW1 to RW(i+1−1), and may not be applied to the pixels PX arranged in the remaining rows RW(i+1) to RWm. In the (h+k+1)-th frame F(h+k+1) than the (h+k)-th frame F(h+k), less data voltages Vd may be provided to the pixels PX in one row.

In the (h+k+2)-th frame F(h+k+2), the data voltages Vd may be applied to the pixels PX arranged in the first to (i+1−2)-th rows RW1 to RW(i+1−2), and may not be applied to the pixels PX arranged in the remaining rows RW(i+1−1)

to RWm. In the (h+k+2)-th frame F(h+k+2) than the (h+k+1)-th frame F(h+k+1), less data voltages Vd may be provided to the pixels PX in one row. This operation may be performed until the (h+2k)-th frame F(h+2k).

In the (h+2k)-th frame F(h+2k), the data voltages Vd may be applied to the pixels PX arranged in the first to i-th rows RW1 to RWi, and may not be applied to the pixels PX arranged in the remaining rows RW(i+1) to RWm. Thereafter, this operation may be performed until the p-th frame Fp.

In such an embodiment, the number of rows of the pixels PX to which the data voltages Vd are applied may increase sequentially and decrease sequentially to a predetermined portion of the still image unit S-IM adjacent to the boundary BA between the moving image unit D-IM and the still image unit S-IM during predetermined frames Fh to F(h+2k) after the first frame F1.

A reference voltage Vref having a predetermined direct-current ("DC") level may be provided to the pixels PX arranged in the rows except for the pixels PX of the rows to which the data voltages Vd are applied. In one embodiment, for example, the reference voltage Vref may be a voltage corresponding to black luminance.

The third and fourth transistors T3 and T4 may be NMOS transistors. NMOS transistors may have a smaller off-leakage current than PMOS transistors.

When displaying a still image on the still image unit S-IM, during the h-th to p-th frames Fh to Fp, the third and fourth transistors T3 and T4 may be turned off. Since the off-leakage current of the third and fourth transistors T3 and T4 is smaller, the amount of discharge of the capacitor CAP is reduced, so that the state of charge of the capacitor CAP may be more easily maintained. Accordingly, during the h-th to p-th frames Fh to Fp, the amount of charge charged in the capacitor CAP is more easily maintained so that the pixels PX can normally display a still image.

Transistors may have hysteresis characteristics. Current flowing through the first transistor T1 may vary according to the hysteresis characteristic of the first transistor T1. Hysteresis characteristics may be changed when data voltages applied to the source electrodes (first electrodes) of the first transistors T1 are different in the current frame and the previous frame. When the hysteresis characteristic is changed, the gate-source voltage versus the source-drain current curve is changed, so the change in the hysteresis characteristic may affect the luminance.

In an embodiment, the hysteresis characteristics of the first transistors T1 of the pixels PX arranged in the still image unit S-IM may be desired to be maintained constant to display a still image. In an embodiment of the invention, by applying the reference voltage Vref to the source electrodes of the first transistors T1 disposed in the still image unit S-IM, the first transistor T1 may be in an on-bias state. In this case, the change in hysteresis characteristics of the first transistors T1 for displaying the still image is reduced, so that the still image may be displayed normally.

In a conventional display device, during h-th to p-th frames Fh to Fp, If data voltages Vd may be continuously provided to the pixels PX of the first to i-th rows RW1 to RWi, and the reference voltage Vref may be continuously provided to the pixels PX of the (i+1)-th to m-th rows RW(i+1) to RWm.

In such a conventional display device, the difference between the hysteresis characteristics of the first transistors T1 disposed in the moving image unit D-IM and the hysteresis characteristics of the first transistors T1 disposed in the still image unit S-IM may increase. As a result, the difference in luminance between the pixels PX arranged in the moving image unit D-IM and the pixels PX arranged in the still image unit S-IM increases, so that the boundary BA between the moving image unit D-IM and the still image unit S-IM may be visually recognized by the user.

In an embodiment of the invention, in the h-th to (h+k)-th frames Fh to F(h+k), the data voltages Vd may be applied to the pixels PX by increasing sequentially the number of the row unit to which the data voltages Vd are applied in units of at least one row from the i-th to (i+1)-th rows RWi to RW(i+1) adjacent to the boundary BA between the moving image unit D-IM and the still image unit S-IM to reduce the difference in hysteresis. In such an embodiment, in the (h+k)-th to (h+2k)-th frames F(h+k) to F(h+2k), the data voltages Vd may be applied to the pixels PX by decreasing sequentially the number of the row unit to which the data voltages Vd are applied in units of at least one row from the (i+1)-th to i-th rows RW(i+1) to RWi adjacent to the boundary BA between the moving image unit D-IM and the still image unit S-IM.

In such an embodiment, the luminance gradually changes from the boundary BA between the moving image unit D-IM and the still image unit S-IM to the (i+1)-th rows RW(i+1) adjacent to the boundary BA so that the boundary BA between the moving image unit D-IM and the still image unit S-IM may not be visually recognized.

As a result, in an embodiment of the display device DD according to the invention, the boundary BA between the moving image unit D-IM and the still image unit S-IM may be effectively prevented from being visually recognized.

Figure 11:
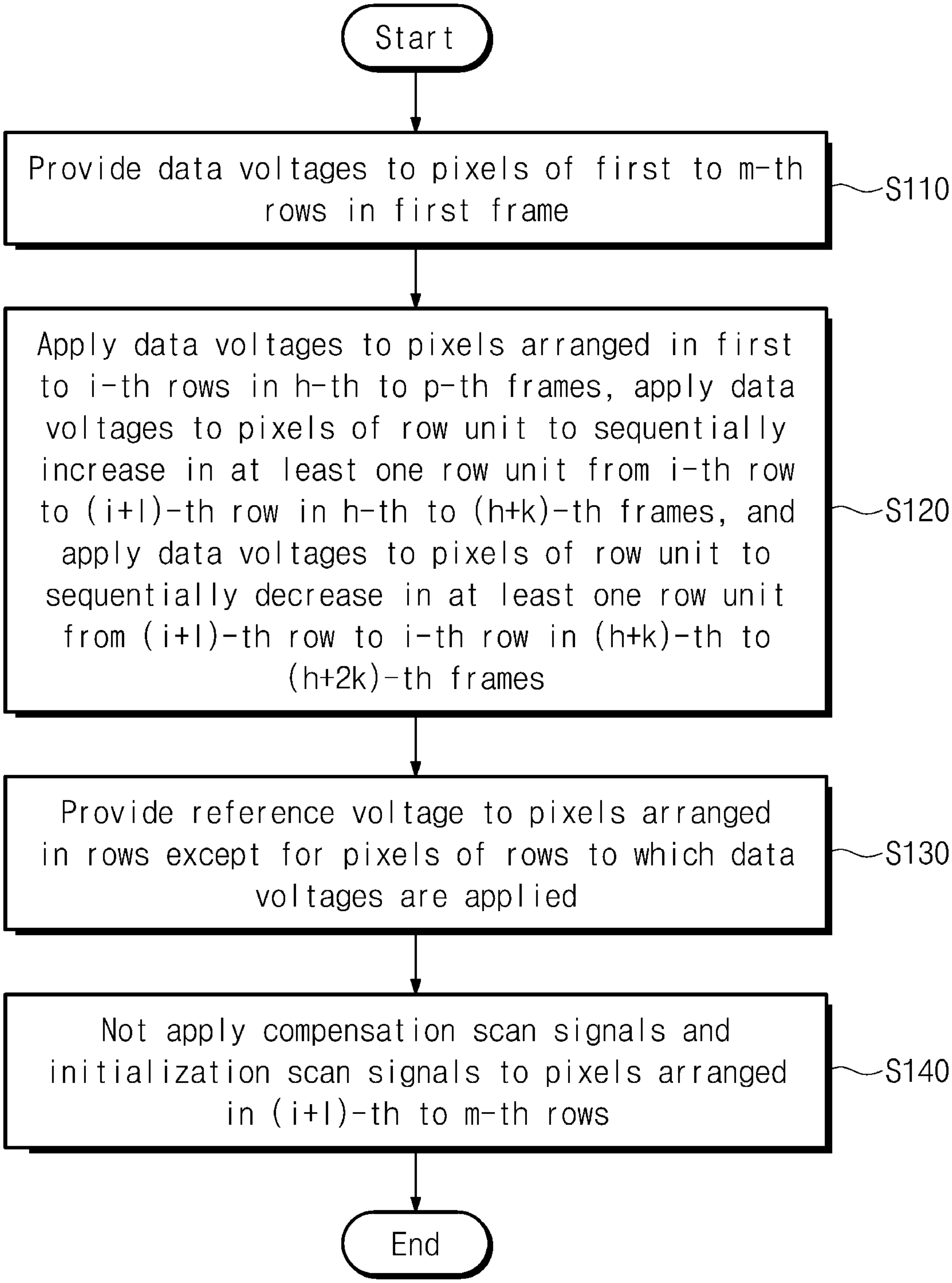
FIG. 11 is a flow chart illustrating a method of driving a display device according to an embodiment of the invention.

FIG. 11 is a flow chart illustrating a method of driving a display device according to an embodiment of the invention.

Referring to FIG. 11, the operation in which the write scan signals GWS(1 to m), the data voltages Vd, the compensation scan signals GCS(1 to m), and the initialization scan signals GIS(1 to m) are applied to the pixels PX may be performed as described below.

In operation S110, the data voltages Vd may be provided to the pixels PX of the first to m-th rows RW1 to RWm in the first frame F1.

In operation S120, the data voltages Vd may be applied to the pixels PX arranged in the first to i-th rows RW1 to RWi in the h-th to p-th frames Fh to Fp. In addition, in the h-th to (h+k)-th frames Fh to F(h+k), the data voltages Vd may be applied to the pixels PX of a row unit from the i-th row (RWi) to the (i+1)-th row RW(i+1) by increasing sequentially the number of the row unit to which the data voltages Vd are applied in at least one row unit. In addition, in the (h+k)-th to (h+2k)-th frames F(h+k) to F(h+2k), the data voltages Vd may be applied to the pixels PX of a row unit from the (i+1)-th row RW(i+1) to the i-th row RWi by decreasing sequentially the number of the row unit to which the data voltages Vd are applied in units of at least one row.

In operation S130, the reference voltage Vref may be provided to the pixels PX arranged in rows except for the pixels PX of the rows to which the data voltages Vd are applied.

In operation S140, compensation scan signals GCS(1 to m) and initialization scan signals GIS(1 to m) may not be applied to the pixels PX arranged in the (i+1)-th to m-th rows RW(i+1) to RWm.

Figure 12:
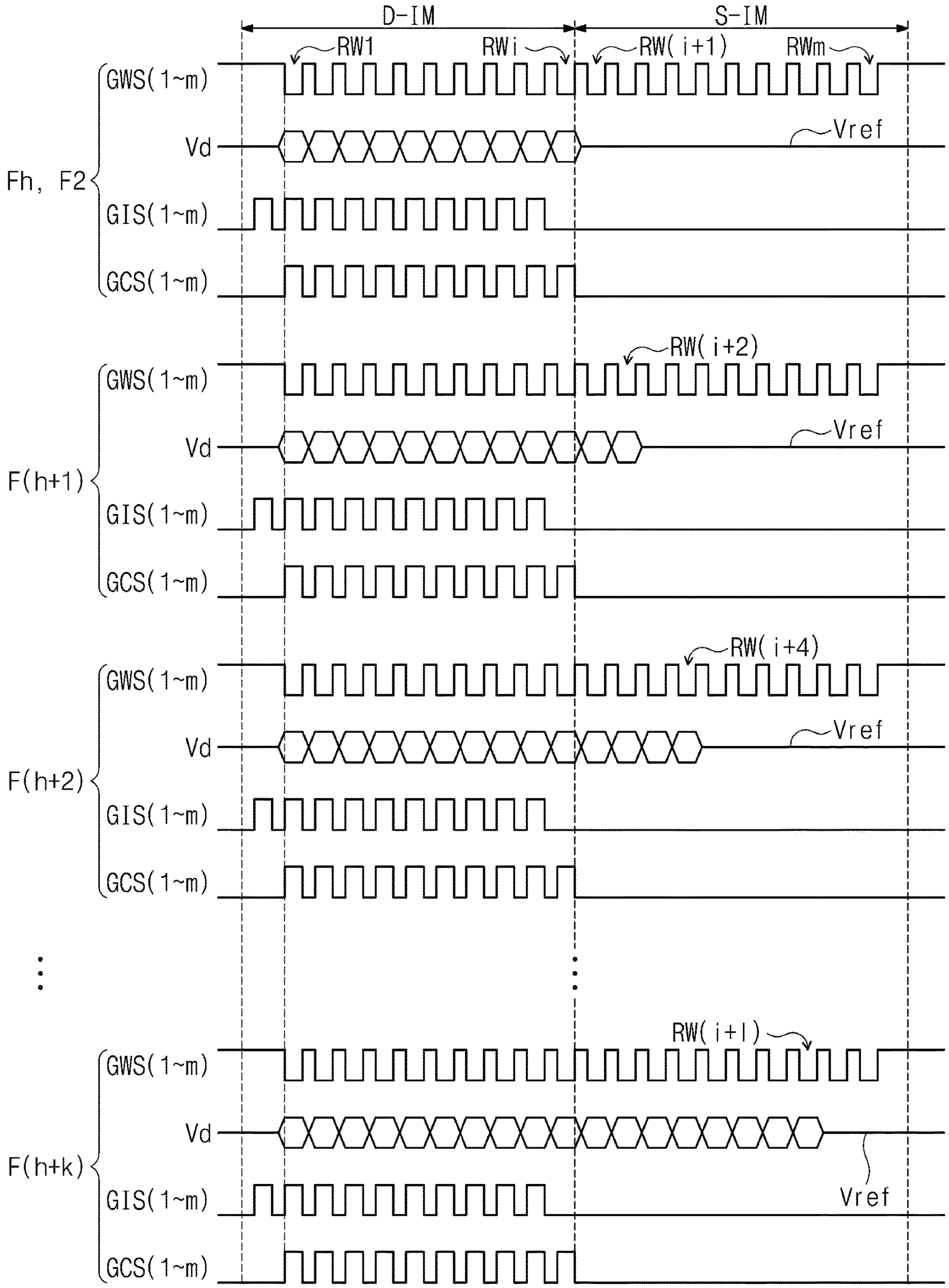
FIG. 12 is a diagram showing timings of signals and data voltages according to an alternative embodiment of the invention.

FIG. 12 is a diagram showing timings of signals and data voltages according to an alternative embodiment of the invention.

In FIG. 12, for example, timings of the first frame F1 and the p-th frame Fp are omitted.

Hereinafter, the operation of the pixels PX will be described mainly with the signals illustrated in FIG. 12.

Referring to FIG. 12, data voltages Vd in the h-th frame Fh may be provided to the pixels PX of the first to i-th rows RW1 to RWi. In the (h+1)-th frame F(h+1), the data voltages Vd may be provided to the pixels PX of the first to (i+2)-th rows RW1 to RW(i+2) in which two rows are further increased. In the (h+2)-th frame F(h+2), the data voltages Vd may be provided to the pixels PX of the first to (i+4)-th rows RW1 to RW(i+4) in which the four rows are further increased. This operation may be performed until the (h+k)-th frame F(h+k).

In an alternative embodiment of the invention, in the h-th to (h+k)-th frames Fh to F(h+k), the data voltages Vd may be applied to the pixels PX in a row unit from the i-th row RWi to the (i+1)-th row RW(i+1) by increasing sequentially the number of the row unit to which the data voltages Vd are applied in units of at least two rows. In FIG. 12, 1 may be a natural number greater than 2.

Thereafter, the operation shown in FIG. 12 may be similar to the operation described above with reference to FIG. 9 except that the number of rows to which data voltages are applied decreases by two. In one embodiment, for example, in the (h+k)-th to (h+2k)-th frames F(h+k) to F(h+2k), the data voltages Vd may be applied to the pixels PX of a row unit from the (i+1)-th row RW(i+1) to the i-th row RWi by decreasing sequentially the number of the row unit to which the data voltages Vd are applied in units of at least two rows.

In an embodiment of the invention, a data voltage may be sequentially applied to a portion of a still image unit adjacent to a boundary between a moving image unit displaying a moving image and a still image unit displaying a still image. Accordingly, the luminance around the boundary between the moving image unit and the still image unit may gradually vary, so that the boundary between the moving image unit and the still image unit may be effectively prevented from visually recognized.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a plurality of pixels arranged in m rows and n columns;

a plurality of write scan lines connected to the pixel and receiving write scan signals;

a plurality of data lines connected to the pixel and receiving data voltages; and a plurality of compensation scan lines connected to the pixel and receiving compensation scan signals, wherein in h-th to p-th frames, the data voltages are applied to pixels arranged in first to i-th rows, wherein in h-th to (h+k)-th frames, the number of rows of the pixels to which the data voltages are applied in a current frame is greater than the number of rows of the pixels to which the data voltages are applied in a previous frame, wherein m, n, h, p, k, i, and l are natural numbers, i is less than m, and (h+k) is less than p, and wherein in the h-th to (h+k)-th frames, the number of the rows of the pixels to which the data voltages are applied increases sequentially in a frame sequence.

2. The display device of claim 1, wherein in the h-th to p-th frames, the compensation scan signals are not applied to pixels arranged in (i+1)-th to m-th rows.

3. The display device of claim 2, wherein in (h+k)-th to (h+2k)-th frames, the data voltages are applied to the pixels of the row unit by decreasing sequentially the number of the row unit to which the data voltages are applied in at least one row unit from the (i+1)-th row to the i-th row.

4. The display device of claim 3, wherein in a first frame, the data voltages are provided to pixels arranged in first to m-th rows, where h is a natural number greater than or equal to 2.

5. The display device of claim 4, wherein a reference voltage having a predetermined direct-current level is applied to pixels arranged in rows excluding the pixels of the rows to which the data voltages are applied.

6. The display device of claim 2, wherein for each of first to p-th frames, the write scan signals are sequentially applied in row units to the pixels arranged in first to m-th rows.

7. The display device of claim 2, wherein the pixels arranged in the first to i-th rows display a moving image.

8. The display device of claim 2, wherein the pixels arranged in the (i+1)-th to m-th rows display a still image.

9. The display device of claim 2, wherein each of the pixels comprises:

a light emitting element including an anode and a cathode;

a first transistor including a first electrode which receives a first voltage, a second electrode connected to the anode, and a control electrode connected to a node;

a second transistor including a first electrode connected to a corresponding data line among the data lines, a second electrode connected to the first electrode of the first transistor, and a control electrode connected to a corresponding write scan line among the write scan lines;

a third transistor including a first electrode connected to the second electrode of the first transistor, a second electrode connected to the node, and a control electrode connected to a corresponding compensation scan line among the compensation scan lines; and a capacitor including a first electrode which receives the first voltage and a second electrode connected to the node.

10. The display device of claim 9, wherein the first and second transistors are p-type metal-oxide-semiconductor transistors, and the third transistor is an n-type metal-oxide-semiconductor transistor.

11. The display device of claim 9, further comprising:

a plurality of initialization scan lines which provides initialization scan signals to the pixels; and a plurality of emission lines which provides emission signals to the pixels.

12. The display device of claim 11, wherein in the h-th to p-th frames, the initialization scan signals are not applied to the pixels arranged in the (i+1)-th to m-th rows.

13. The display device of claim 11, wherein each of the pixels further comprises a fourth transistor including a first electrode connected to the node, a second electrode which receives a first initialization voltage, and a control electrode connected to a corresponding initialization scan line among the initialization scan lines.

14. The display device of claim 13, wherein the fourth transistor is an n-type metal-oxide-semiconductor transistor.

15. The display device of claim 11, wherein each of the pixels further comprises:

a fifth transistor including a first electrode which receives the first voltage, a second electrode connected to the first electrode of the first transistor, and a control electrode connected to a corresponding emission line among the emission lines; and a sixth transistor including a first electrode connected to the second electrode of the first transistor, a second electrode connected to the anode, and a control electrode connected to the corresponding emission line, wherein the fifth and sixth transistors are p-type metal-oxide-semiconductor transistors.

16. The display device of claim 11, wherein an initialization scan signal applied to a corresponding initialization scan line among the initialization scan lines is applied to each of the pixels before a write scan signal applied to the corresponding write scan line and a compensation scan signal applied to the corresponding compensation scan line.

17. The display device of claim 9, wherein each of the pixels comprises:

a seventh transistor including a first electrode connected to the anode, a second electrode which receives a second initialization voltage, and a control electrode connected to an initialization scan line of a next stage of the corresponding initialization scan line; and a boosting capacitor connected to a first electrode connected to the corresponding write scan line and the node, wherein the seventh transistor is a p-type metal-oxide-semiconductor transistor.

18. The display device of claim 2, wherein in the h-th to (h+k)-th frames, the data voltages are applied to the pixels of the row unit by increasing sequentially in units of at least two rows from the i-th row to the (i+1)-th row.

19. The display device of claim 18, wherein in (h+k)-th to (h+2k)-th frames, the data voltages are applied to the pixels of the row unit by decreasing sequentially the number of the row unit to which the data voltages are applied in units of at least two rows from an (i+1)-th row to an i-th row.

* * * * *